Jan. 30, 1968
G. J. CHESSARE ET AL
3,365,969
TRANSFER PULLEY TENSIONING DEVICE
Filed June 11, 1965
2 Sheets-Sheet 1
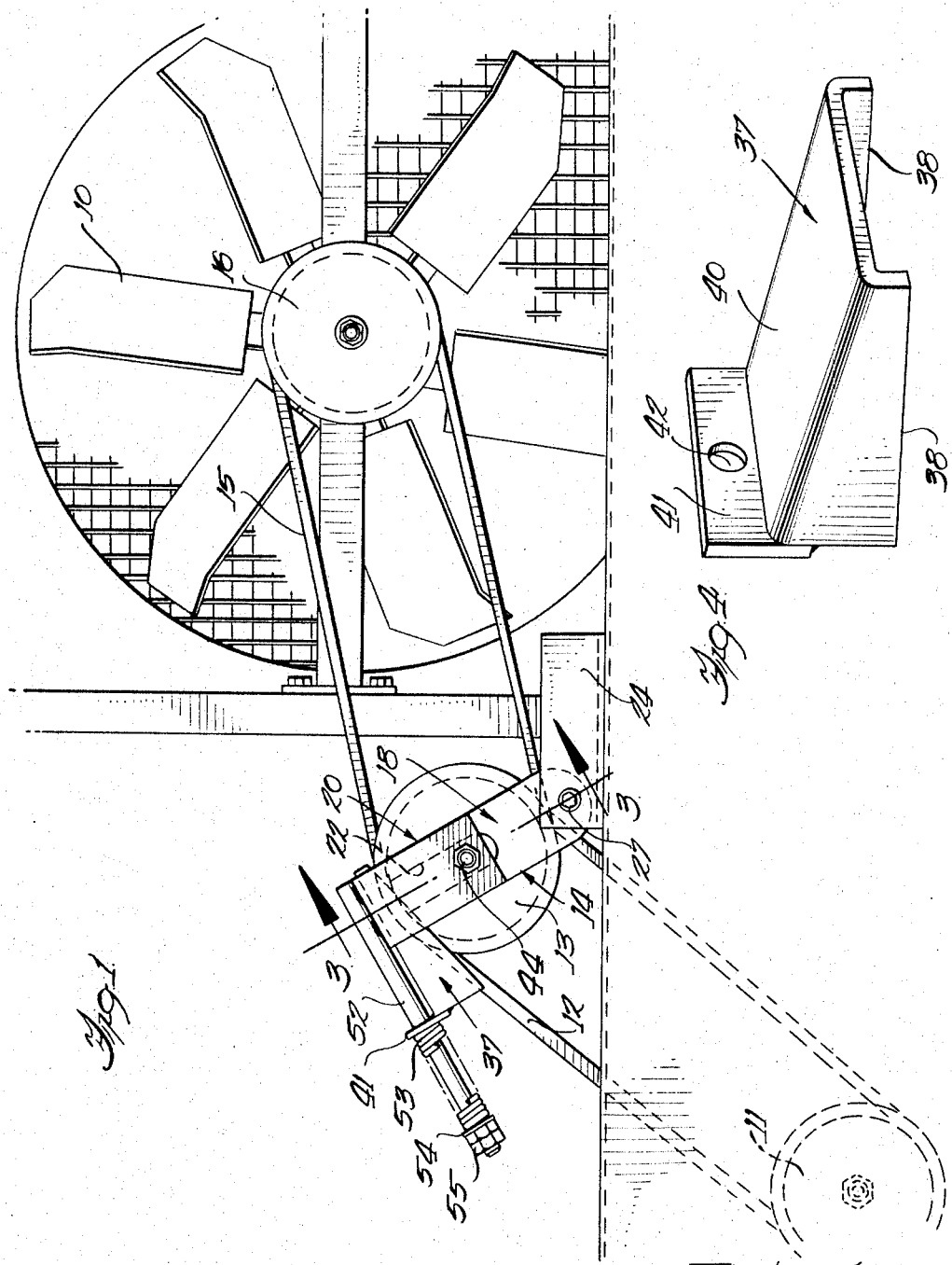

Jan. 30, 1968  G. J. CHESSARE ETAL  3,365,969
TRANSFER PULLEY TENSIONING DEVICE
Filed June 11, 1965  2 Sheets-Sheet 2
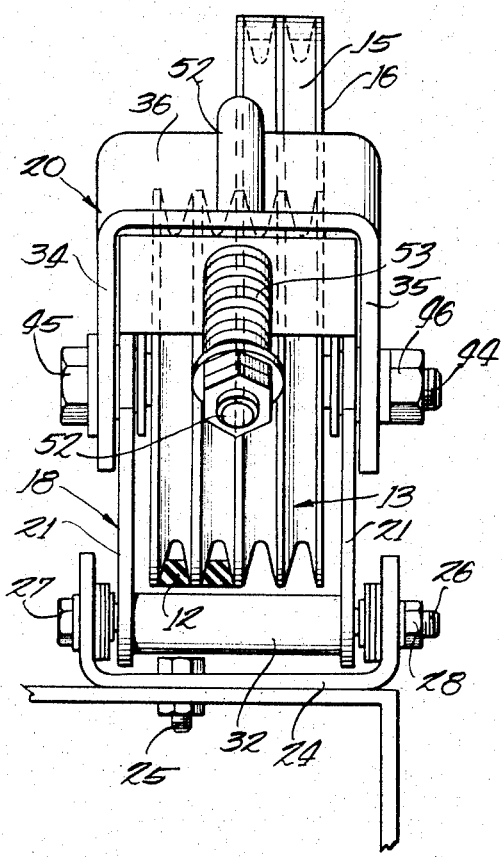
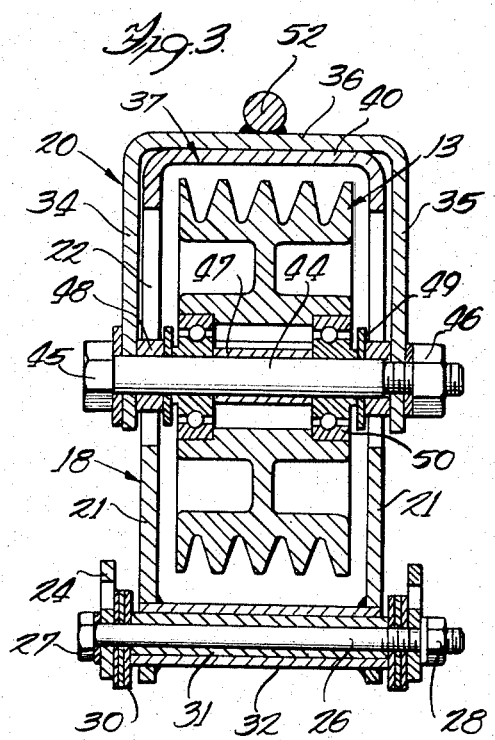
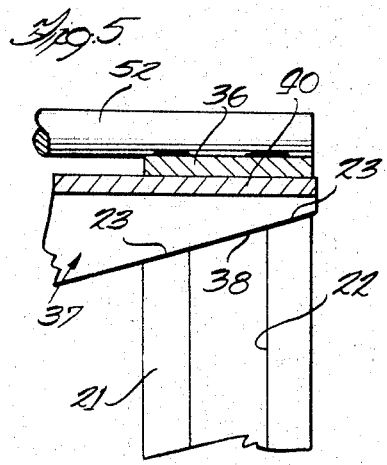
Inventors
George J. Chessare
Joseph J. Farwell
Paul E. Merriman
Frederick J. Kuube
Attorney

United States Patent Office 3,365,969
Patented Jan. 30, 1968

3,365,969
TRANSFER PULLEY TENSIONING DEVICE
George J. Chessare, Roanoke, and Joseph J. Farwell and Paul E. Merriman, Fort Wayne, Ind., assignors to International Harvester Company, a corporation of Delaware
Filed June 11, 1965, Ser. No. 463,118
3 Claims. (Cl. 74—242.12)

ABSTRACT OF THE DISCLOSURE

A belt tightener including a pair of telescoping members, one of which is pivotally connected to a fixed support and the other of which carries a rotatable pulley. A generally wedge-shaped cam member engages both telescoping members and a helically-wound compression spring reacting on the cam member is effective to continually urge the telescoping members in one direction with respect to each other, and movement of the telescoping members in the opposite direction is prevented by the action of the spring and the angular relationship of the interengaging surfaces of the cam member and the telescoping members.

---

The invention relates to belt tighteners and to tension devices for chain and belt drives and transmission arrangements, and has reference in particular to novel and improved belt tensioning devices having spring energized, non-return means.

In order to take up the slack in the driving chain or belt of power drives and similar transmission arrangements tensioning devices have been employed. These devices are spring energized and generally an idler pulley bears against the chain or belt to maintain the same in a taut condition. Although the invention relates to belt tensioning mechanism of this character, one of the main objectives of the invention is to provide non-return means so that vibration and the like will not reverse the progressive action of the tensioning mechanism in holding the belt in a taut condition.

Another object of the invention is to provide an improved belt tensioning device having non-return means in the form of a spring energized cam member carried by the device and effective at all times in preventing any return or retrograde movement of the belt tensioning element of the device.

A further object is to provide an improved belt tensioning device having a spring energized cam member carried by the device and which performs a dual function. First of all, the cam member is spring urged in a direction to take up slack in the belt and maintain the same in a taut condition. Secondly, the cam member is effective at all times in preventing any return or retrograde movement of the belt-tensioning element and thus the cam member functions as non-return means for the said tensioning element.

Another and more specific object of the invention is to provide a belt tensioning device which will employ a single coil spring for energizing the belt tensioning element in a tensioning direction and for also energizing the cam member so that the same will function as non-return means. This dual function of the coil spring is accomplished by the specific arrangement of the elements wherein the coil spring acts through the cam member to urge the belt tensioning element in a tensioning direction for taking up any slack in the belt.

With these and various other objects in view, the invention may consist of certain novel features of construction and operation as will be more fully described and particularly pointed out in the specification, drawings, and claims appended thereto.

In the drawings which illustrate an embodiment of the device and wherein like reference characters are used to designate like parts.

FIGURE 1 is a side elevational view showing a belt drive having combined therewith the belt tensioning mechanism of the present invention;

FIGURE 2 is a rear elevational view looking from the left to the right of FIGURE 1 and showing on a larger scale the belt tensioning device of the invention;

FIGURE 3 is a longitudinal sectional view of the belt tensioning device taken substantially on line 3—3 of FIGURE 1;

FIGURE 4 is a perspective view of the cam member; and

FIGURE 5 is a fragmentary sectional view illustrating the camming action of the cam member.

The invention as shown in the drawings is applied to a belt drive for driving the fan 10 of an automotive vehicle. The driving pulley is indicated by numeral 11 and the endless belt 12 operatively connects the driving pulley with the intermediate tensioning pulley 13. The support for the tensioning pulley is indicated in its entirety by the numeral 14 and the drive is continued by the endless belt 15 which operatively connects the tensioning pulley 13 with the pulley 16. The pulley 16 comprises the driven pulley of the arrangement, and the same is mounted on and is fixed to the shaft which journals the fan 10 for rotation.

The support 14 is adjustable in a longitudinal direction and when adjusted outwardly the tensioning pulley 13 is caused to take up slack in both of the driving belts 12 and 15. Thus, when the support is urged upwardly and to the left, or in other words, when the support as shown in FIGURE 1 is lengthened the belt 12 is tensioned as is also the belt 15. However, when the support is reduced in length all tensioning on the belt is lost.

The support 14 is spring energized in an upward direction for tensioning purposes and in combination with such a support the invention provides a non-return cam which performs the dual function of tensioning the driving belts to take up any slack therein and which also forms a non-return element preventing reverse movement of the belt tensioning pulley 13. This structure will now be described.

As best shown in FIGURES 2 and 3 the support 14 essentially consists of an inside standard or pedestal 18 and an outside standard 20. The inside pedestal and outside standard are relatively movable in a longitudinal direction since standard 20 has telescoping relation on the pedestal 18. Both the pedestal and telescoping standard are approximately U-shaped in section as shown in FIGURE 3, the pedestal including side walls 21 which are slotted at 22 and which terminate in the top diagonal edges 23 as clearly shown in FIGURE 5. The pedestal is pivotally mounted on bracket 24 which is fixed to the frame of the vehicle by one or more fastening bolts 25. The pivot pin 26 is supported by the bracket and held in place by the head 27 and nut 28 at respective ends. Between the end washers 30 the pivot pin mounts the tube 31 and the telescoping sleeve 32 is rotatable on the tube. Said sleeve is suitably fixed to the pedestal being welded thereto or otherwise secured to the side walls 21 and thus the pedestal has free pivotal movement on the pivot pin 26 as an axis.

The outside standard 20 includes side walls 34 and 35 and a connecting top wall 36. In FIGURE 3, the top wall 36 is shown in contact with the cam member 37 which is interposed between the pedestal and the outside telescoping standard. The bottom camming edges 38 of the cam member 37 have contact with the diagonal edges 23 of the pedestal. The top wall 40 of the camming member is in contact with top wall 36 of the standard.

In accordance with the invention the outside standard 20 journals the tension pulley 13 by means of the journalled bolt 44 carried by the apertured side walls and held in place by the head 45 and nut 46 respectively. The sleeve 47 is disposed centrally on the bolt 44. Mounted on the bolt 44 at each end of the sleeve 47 and held in place by the spacers 48 and washers 49, are the ball bearings 50 which mount the tensioning pulley 13 for substantially frictionless rotation.

The bolt 44 extends through the slots 22 formed in the side walls 21 of the pedestal 18. In fact, the spacers 48 are in substantial alignment with the slots which extend from approximately midway of the pedestal to the top terminal end of the pedestal which provides the diagonal edges 23. Accordingly, the outside standard 20 and the tensioning pulley 13 carried by the standard are able to move longitudinally of the pedestal and in so doing the support 14 is either lengthened or shortened.

As previously explained the cam member 37 is spring energized in a camming direction for tensioning the driving belts 12 and 15. For this purpose, the standard 20 carries the rod 52 which is welded to the top wall 36 of the standard and extends rearwardly in the general direction of the top run of the belt 12. The end wall 41 of the cam member is apertured at 42 for accommodating the rod 52. The rod extends through the opening in wall 41 and rearwardly of the cam member for receiving the coil spring 53. One end of the coil spring contacts the end wall 41 of the cam member. The other end of the spring is backed by the washer 54 which is retained on the rod by the nuts 55.

The resilient action of the coil spring 53 is to urge the cam member 37 forwardly in a direction toward the right, FIGURE 1. Thus, the camming of the outside standard 20 is such as to lengthen the support for tensioning pulley 13, and accordingly, this tensioning of the pulley is in a direction to take up the slack in the driving belts 12 and 15 to thereby maintain the belts in a taut condition. The coil spring also acts on the cam member to prevent any reverse or retrograde movement such as would shorten the support and allow slack to develop in the driving belts. These two functions are accomplished by the combination of a single coil spring and cam member so that the device of the invention is relatively simple in construction since it embodies only a few parts although the present device operates in a highly successful manner.

The invention is not to be limited to or by details of construction of the particular embodiment hereto illustrated as various other forms of the device will, of course, be apparent to those skilled in the art without departing from the spirit of the invention or the scope of the claims.

What is claimed is:

1. A belt tightener comprising an inner pedestal and an outer, substantially U-shaped standard having telescoping relation with the pedestal, said pedestal including a pair of spaced, elongated substantially parallel side walls, each of said side walls being adjacent to a respective leg of said U-shaped standard, the longitudinal axes of said side walls and said standard legs lying substantially in a common plane, the bight portion of said U-shaped standard being substantially flat, and each of said pedestal side walls having an end edge inclined with respect to the longitudinal axis thereof and having an elongated slot formed therethrough extending longitudinally from said inclined end edge, means pivotally connecting the ends of said pedestal side walls opposite said slots to a fixed support; a rotary pulley disposed between said pedestal side walls; journalling means for said rotary pulley fixedly carried by said standard legs adjacent the free ends thereof and extending substantially perpendicular to the longitudinal axes of said standard legs, said journalling means including a pair of spaced, generally circular spacers, each of said spacers being disposed in a respective one of said slots and being engageable with the side wall surface portion defining said slot for guided relative sliding movement along the longitudinal axis of said slot, means for biasing said pulley in a direction away from said means pivotally connecting the ends of said pedestal side walls to a fixed support along the longitudinal axes of said slots including a substantially U-shaped cam member having a substantially flat bight portion abutting and slidable with respect to said standard bight portion, said cam member having a pair of spaced and parallel legs, the free end edge surface of each of said cam member legs being inclined with respect to the bight portion of the cam members and slidably engaging an inclined end edge of a respective pedestal side wall, and spring means continually urging said cam member in one direction to therby urge said standard away from said pedestal along the longitudinal axes of said pedestal side wall slots.

2. A belt tightener as set forth in claim 1, wherein said means for biasing said pulley includes an elongated rod having one end fixedly secured to said bight portion of said standard, and said cam member has an end wall extending normally to the bight portion thereof provided with an aperture therethrough through which said rod extends, and said spring means including a coiled spring carried on and encircling said rod and having one end reacting against said cam member end wall.

3. A belt tightener as set forth in claim 2, wherein the free end of said rod is provided with screw threads, and said means for biasing said pulley further includes a nut threadingly engaging said screw threads, said coiled spring having its other end reacting against said nut, said nut being rotatable on said screw threads for adjusting the longitudinal position thereof with respect to said rod to thereby adjust the resilient force exerted by said spring on said cam member.

References Cited

UNITED STATES PATENTS 3,217,612   11/1965   Graham _____ 74—242.14

FOREIGN PATENTS 522,931   4/1921   France.
194,954   3/1923   Great Britain.
364,942   11/1962   Switzerland.

FRED C. MATTERN, Jr., Primary Examiner.

DAVID J. WILLIAMOWSKY, Examiner.

J. A. WONG, Assistant Examiner.